US011027438B2

(12) United States Patent
Keen et al.

(10) Patent No.: US 11,027,438 B2
(45) Date of Patent: Jun. 8, 2021

(54) POSITIVE POSITIONING DEVICE AND SYSTEM

(71) Applicant: A-dec, Inc., Newberg, OR (US)

(72) Inventors: Dudley Keen, Sherwood, OR (US); Stephen N. Weiler, Dundee, OR (US); Patrick W. Berry, Vancouver, WA (US)

(73) Assignee: A-dec, Inc., Newberg, OR (US)

( * ) Notice: Subject to any disclaimer, the term of this patent is extended or adjusted under 35 U.S.C. 154(b) by 173 days.

(21) Appl. No.: 16/035,168

(22) Filed: Jul. 13, 2018

(65) Prior Publication Data

US 2020/0016774 A1    Jan. 16, 2020

(51) Int. Cl.
| | |
|---|---|
| *B25J 19/00* | (2006.01) |
| *A61G 15/16* | (2006.01) |
| *B25J 17/00* | (2006.01) |
| *F16D 25/0638* | (2006.01) |
| *F16D 13/64* | (2006.01) |

(Continued)

(52) U.S. Cl.
CPC .......... *B25J 19/0004* (2013.01); *A61G 15/16* (2013.01); *B25J 17/00* (2013.01); *F16D 13/52* (2013.01); *F16D 13/648* (2013.01); *F16D 13/683* (2013.01); *F16D 25/0638* (2013.01)

(58) Field of Classification Search
CPC ....... B25J 19/0004; B25J 17/00; A61G 15/16; F16D 25/0638; F16D 13/648; F16D 13/683; F16D 13/52; F16D 49/08; F16D 49/10; F16M 11/2064; F16M 2200/065; F16M 11/08; F16C 11/103
USPC ... 248/278.1, 280.11, 282.1, 292.11, 297.11, 248/334.1
See application file for complete search history.

(56) References Cited

U.S. PATENT DOCUMENTS

| | | | | |
|---|---|---|---|---|
| 336,220 A | * | 2/1886 | Farrar | A47C 1/08 |
| | | | | 297/242 |
| 3,072,374 A | * | 1/1963 | Bodian | F16M 11/2064 |
| | | | | 248/278.1 |

(Continued)

FOREIGN PATENT DOCUMENTS

| | | |
|---|---|---|
| CN | 104930091 | 9/2015 |
| DE | 19526915 | 5/2004 |
| GB | 1056379 | 1/1967 |

OTHER PUBLICATIONS

Translation of DE19526915 A1, Giordano, Nicola, Dipl. (Year: 1997).*

(Continued)

*Primary Examiner* — Muhammad Ijaz
(74) *Attorney, Agent, or Firm* — Klarquist Sparkman, LLP

(57) ABSTRACT

A positive positioning device comprises a plurality of stacked plates, a body, a spring-biased piston and a piston release device. The plurality of stacked plates have a central opening defined to receive a pivot shaft. The body houses the plurality of stacked plates and has an internal bore within which a cylinder is defined. The spring-biased piston is shaped to slide within the bore to apply a force to the stacked plates to resist rotation of a pivot shaft inserted through the central opening in the stacked plates. The piston release device is actuatable by a user to release the piston to decrease force applied to the stacked plates and allow free rotation of the pivot shaft.

31 Claims, 8 Drawing Sheets

(51) Int. Cl.
*F16D 13/68* (2006.01)
*F16D 13/52* (2006.01)

(56) References Cited

U.S. PATENT DOCUMENTS

| | | | | |
|---|---|---|---|---|
| 4,427,382 | A * | 1/1984 | Hoffmeister | A61G 15/16 433/33 |
| 4,821,159 | A * | 4/1989 | Pike | F16M 11/2014 248/282.1 |
| 6,109,575 | A * | 8/2000 | Munson | F16M 11/08 248/200 |
| 8,876,075 | B2 * | 11/2014 | Diez | F16M 11/2014 248/274.1 |
| 2005/0127724 | A1 * | 6/2005 | Irwin | A61G 15/16 297/188.01 |
| 2007/0237291 | A1 * | 10/2007 | Nanni | A61B 6/4488 378/38 |
| 2009/0212184 | A1 * | 8/2009 | Bourgeois | F16M 11/10 248/288.11 |
| 2010/0159415 | A1 * | 6/2010 | Benfield | A61G 15/16 433/79 |
| 2010/0227292 | A1 * | 9/2010 | Benfield | A61G 15/14 433/33 |
| 2011/0104634 | A1 * | 5/2011 | Kyostila | A61B 6/04 433/29 |
| 2013/0247919 | A1 | 9/2013 | Chauvette et al. | |
| 2014/0243849 | A1 * | 8/2014 | Saglam | A61B 34/75 606/130 |
| 2016/0146266 | A1 * | 5/2016 | Kremer | F16D 13/648 192/70.11 |
| 2016/0341267 | A1 * | 11/2016 | Takada | F16D 41/105 |
| 2017/0071810 | A1 * | 3/2017 | Bringel | A61G 15/10 |
| 2017/0100844 | A1 * | 4/2017 | Raak | B25J 9/08 |
| 2017/0119512 | A1 * | 5/2017 | Westlake | A61C 19/066 |
| 2017/0217025 | A1 * | 8/2017 | Okada | B25J 17/00 |
| 2018/0147734 | A1 * | 5/2018 | Nakayama | B25J 17/00 |
| 2019/0111328 | A1 * | 4/2019 | Tolman | A63B 69/3623 |
| 2020/0011392 | A1 * | 1/2020 | Sakai | F16F 1/328 |
| 2020/0016774 | A1 * | 1/2020 | Keen | F16M 11/2064 |
| 2020/0094421 | A1 * | 3/2020 | Morimura | B25J 17/00 |
| 2020/0246110 | A1 * | 8/2020 | Pichler | F16M 13/027 |
| 2020/0305702 | A1 * | 10/2020 | Yoshikawa | A61B 1/0002 |

OTHER PUBLICATIONS

International Search Report and Written Opinion for PCT/US2019/041569, dated Nov. 3, 2019.
A-dec© Service Guide, vol. II, Featuring A-dec 500® and Clinical Products, Revision B Apr. 2007, 480 pages (2007).

* cited by examiner

POSITIVE POSITIONING DEVICE AND SYSTEM

BACKGROUND

This application relates to dental equipment, and specifically to a positive positioning device and system for keeping a dental unit and/or other equipment in desired position(s) for use.

In a typical dental operatory setting, equipment used by a dentist, oral surgeon, dental assistant or other practitioner is arranged in close proximity to a dental chair in which a patient is seated for convenience and efficiency. Such equipment may include a dental unit from which instruments that use water, pressurized air, suction, electrical power, etc. are accessed, as well as equipment of other types, including lights, monitors, other types of instruments, etc. The dental unit or other equipment can be supported in a desired position by one or more arms that are mounted to the dental chair or another location, such as a cabinet, wall, floor or ceiling of the operatory and selectively movable.

For equipment mounted on arms designed to move or pivot in a horizontal plane, drift or undesired movement can occur if the arm and its pivot connection are not level. As a result, such equipment may not remain positioned as desired, and in some cases, the equipment and/or arm may contact other nearby objects, which is inconvenient and may cause unwanted wear and/or damage. Steps taken to prevent drift and undesired movement in out-of-level installations, such as adding resistance to the pivot connection, tend to make the arm and equipment feel more difficult to position, which detracts from ease of operability.

Equipment may need to be repositioned multiple times, even during a single procedure, so providing an easy to use device that would assist in positively positioning the dental unit and/or other equipment, i.e., initially positioning it in a desired position and maintaining that position until it is deliberately repositioned, would be advantageous.

SUMMARY

Described below are implementations of a positive positioning device that can be used to control the force required to pivot an arm around a pivot joint, such as a dental unit pivot arm used to support a control head, to allow both selective pivoting and resistance to pivoting as desired.

According to one implementation, a positive pivoting device comprises a plurality of stacked plates having a central opening defined to receive a pivot shaft, a body within which the plates are housed and having an internal bore within which a cylinder is defined, a spring-biased piston shaped to slide within the bore to apply a force to the stacked plates to resist rotation of a pivot shaft inserted through the central opening in the stacked plates, and a piston release device actuatable by a user to release the piston to decrease force applied to the stacked plates and allow free rotation of the pivot shaft.

The piston release device can comprise a connection to a pneumatic circuit configured to apply pneumatic pressure to counteract the spring-biased piston. The piston release device can comprise a capacitive touch handle configured to actuate the piston release device upon a predetermined touch by the user.

The piston release device can be manually actuatable by a user. The piston release device can be remotely positioned relative to the piston.

The stacked plates can comprise a first plurality of keyed clutch plates and a second plurality of keyed friction plates, wherein the clutch plates and the friction plates are interleaved with each other, and wherein the keyed clutch plates are keyed with one of the body or the pivot shaft; and wherein the keyed friction plates are keyed with the other of the body or the pivot shaft. The friction plates can be internally keyed to engage a slot in the pivot shaft and the clutch plates are externally keyed to engage a slot in the body (or vice versa). The central opening in the stacked plates can be positioned to extend vertically such that a pivot shaft received in the opening pivots in a horizontal plane.

The positive positioning device can further comprise a retaining member engageable with an end of the body to retain the spring-biased piston in position.

The spring-biased piston can comprise a piston, at least one peripheral seal on the piston and a spring, such as a wave washer shaped to fit between the piston and a stationary surface. The piston can be a first piston, and wherein the piston release device can be configured to release a second piston concurrent with releasing the first piston.

The force applied to the plates by the piston can be a positive positioning force sufficiently high to prevent drift of a member pivotably mounted to the pivot shaft.

The positive positioning device can comprise a dental unit arm and a control head, wherein the pivot shaft is a dental unit arm pivot shaft that couples the dental unit arm to a dental chair assembly.

According to one implementation, a positive positioning system comprises at least a first arm segment pivotably connected at a proximal end to a first pivot, at least a second arm segment coupled directly or indirectly to the first arm segment at a second pivot, a first positive positioning device located at the first pivot, and a second positive positioning device located at the second pivot. The first and second positive positioning devices can be set to normally resist rotation of the first and second pivots, respectively. The positive positioning system can further comprise a user handle positioned distally of the second pivot, the user handle being actuatable to trigger release of the first and second positive positioning devices to allow the user to reposition at least one of the first and second arm segments.

The first and second positive positioning devices can be normally spring-biased to apply force to the respective first and second pivot connections to resist pivoting movement thereof. The first and second positive positioning devices can be releasable by user actuation of the user handle. The user handle can be connected by a control line to the first positive positioning device and the second positive positioning device.

The first and second pivots can be configured for rotation in horizontal planes, further comprising at least one vertical plane pivot configured to allow rotation in a vertical plane, the vertical plane pivot connection comprising a brake, wherein the brake is configured to be actuatable concurrent with actuation of the first and second positive positioning devices.

The first arm segment can comprise a vertical post portion and the second pivot can be located at a distal end of the post portion, further comprising a knuckle with a vertical plane pivot connection positioned adjacent the second pivot and connected to the second arm segment.

There can be a second knuckle with a vertical plane pivot connection positioned at a distal end of the second arm segment and a support arm segment extending from the second knuckle and configured to support a control head.

The first positive positioning device, the second positive positioning device, the brake and the user handle can be configured for interconnection in a pneumatic circuit. The pneumatic circuit can comprise a brake control solenoid valve controlled by the user handle and a quick exhaust with connections to the first positive positioning device, the second positive positioning device and the brake.

The positive positioning system can comprise a dental unit control head positioned distally of the second arm segment, and wherein the positive positioning system is configured to support and maintain a desired position of the dental unit control head.

The first arm segment can comprise a vertically-extending post portion defining the distal end of the first arm segment such that the first pivot is positioned at a first level and the second pivot is positioned at a second level higher than the first level.

The foregoing and other objects, features, and advantages of the invention will become more apparent from the following detailed description, which proceeds with reference to the accompanying figures.

DETAILED DESCRIPTION

Described below are representative embodiments of a positive positioning device implemented for dental or other equipment, such as a dental unit, as well as a dental treatment assembly (sometimes referred to as a dental treatment center) that includes multiple positive positioning devices.

Figure 1:
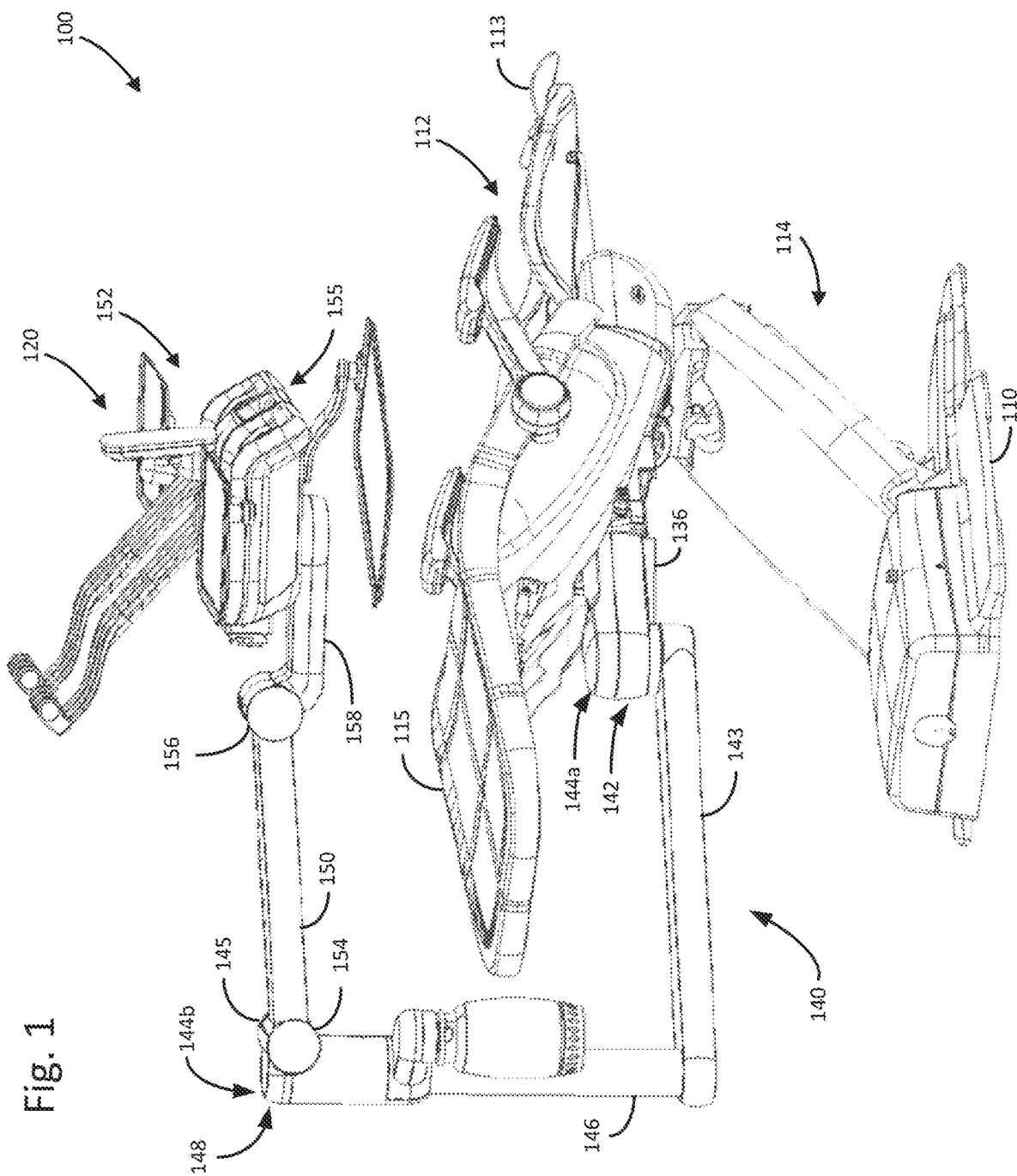
FIG. 1 is a perspective view of a dental treatment assembly.

FIG. 1 is a perspective view of one example of a dental treatment assembly 100 having a chair assembly 112 and a dental unit 120, which is described below in greater detail. The chair assembly 112 has a base 110, and a height adjustment mechanism 114 coupled to the base 110 and configured to change a height of the dental chair assembly 112. In FIG. 1, the chair assembly 112 is shown in a fully reclined position with an upper end (head end) having a head rest 113 at the right side of the figure, and an opposite lower end 115 at the left side of the figure. The angle of the chair assembly 112 between the head rest 113 and the lower end 115 is fully adjustable about a hinged joint between the upper and lower sections from the fully reclined position as shown through a range of positions up to and including a fully seated position.

As used herein, the dental unit 120, sometimes referred to as the unit or the dental operative unit, refers to the device or devices that provide the necessary utilities and amenities to provide treatment to the patient (including but not limited to compressed air, water, suction, electricity, touch or other control for integrated devices, holders for instruments and other components, etc.). The dental unit 120 can include one or more arms, such as the dental unit arm 140 in the illustrated implementation, to support a control head 152 and/or other equipment. The control head 152 is supported by the dental unit arm 140 to provide the instruments and components of the dental unit 120 at positions convenient for treatment and is movable, e.g., to provide space for ingress and egress from the chair assembly 112.

The dental unit arm 140 has a proximal end mounted to the chair assembly 112 at a dental unit arm mount 136, which in the illustrated implementation is positioned below the lower section of the chair assembly 112, e.g., on a lower surface thereof. The dental unit arm 140 is pivotably coupled to the dental unit arm mount 136 by a dental unit arm pivot 142. In the illustrated implementation, the dental unit arm 140 is configured to pivot in a substantially horizontal plane.

The dental unit arm pivot 142 includes a positive positioning device 144a that is selectively configurable to provide resistance to pivoting motion, e.g., to prevent the dental unit arm 140 from drifting from a desired position. Thus, if the dental unit arm 140 tends to pivot away from a desired set position, e.g., because the dental unit arm 140 is not positioned exactly level with a horizontal plane, then the positive positioning device 144a can be configured to provide sufficient resistance to retain the dental unit arm 140 in the desired position.

In some implementations, the positive positioning device 144a is configured to allow the resistance to pivoting it provides to be overcome, but to require sufficient force from the user to ensure that such pivoting motion, above the applied resistance to pivoting, is intentional. For example, in a crowded operatory, a user may need to move an arm or equipment attached to an arm but the release device is not conveniently positioned for the user to actuate it. In another scenario, if a user or other individual inadvertently contacts the arm or equipment with sufficient force, it will move rather than remain in position, which can reduce the risk of injury.

In still other implementations, the positive positioning device can be configured to prevent or nearly prevent all pivoting motion. The structure of the positive positioning device 144a is described below in more detail.

The dental unit arm 140 may have one or more arm segments. For example, as shown in the implementation of FIG. 1, there may be an upright member or post 146 extending from a distal end of a first arm segment 143 connected to the dental arm unit pivot 142. The post 146 can support additional arm segments and/or other objects. For example, the post 146 can pivotably support a flex arm 150 that is pivotably coupled to pivot about the post 146 at a flex arm pivot 148.

In the illustrated implementation, the flex arm pivot 148 has a positive positioning device 144b that is similar to the positive positioning device 144a. Thus, the positive positioning device 144b is selectively configurable to provide resistance to pivoting motion, e.g., to prevent the flex arm 150 from drifting from a desired position.

Desirably, if the positive positioning device 144*b* has the same configuration as the positive positioning device 144*a*, then fewer different components are required, which reduces the number of unique components required. Also, if the positive positioning device 144*a*, 144*b* has a small overall size, e.g., as shown in the illustrated implementations, then the same configuration can be adapted for use in multiple, different applications.

In the illustrated implementation, the flex arm 150 is also coupled for selective movement in the vertical plane relative to the post 146 by a flex arm knuckle 154. In the illustrated implementation, the flex arm knuckle 154 is positioned adjacent a distal end of the post 146. The flex arm knuckle 154 can be minimally offset from the post 146 as shown. In other implementations, the flex arm knuckle could be aligned with the post 146, or separated from the post 146 by a distance sufficient to identify another arm segment between the post 146 and the flex arm 150.

As shown in FIG. 1, there can be a support or support arm 158 that is coupled to a distal end of the flex arm 150 and supports the control head 152 (and possibly other components). The support arm 158 is configured to support at least the control head 152, at selected positions in space, and to allow movement between various positions. In the illustrated implementation, the support arm 158 is coupled to the flex arm 150 by a support arm knuckle 156 that permits rotation of the support arm 158 in the vertical plane. In the illustrated implementation, rotation of the support arm 158 is constrained by rotation of the flex arm 150. For example, the flex arm 150 can be fitted with an internal four-bar linkage or other similar mechanism that maintains the support the support arm 158 in a desired orientation (e.g., horizontal) as the flex arm 150 is rotated through a range of angles.

The motion of the flex arm 150 in the vertical plane can be controlled by a brake, such as a band-type brake 145. The band-type brake 145 can be any type of band-type brake designed to fix the position of the flex arm relative to a horizontally extending pivot shaft. The band-type brake 145 can be located in the flex arm 150, the flex arm knuckle 154 and/or the support arm knuckle 156. If the flex arm 150 is fitted with a four-bar linkage or other similar mechanism, then it may be sufficient to use a single brake to fix the position of two joints (e.g., 154, 156) connected by the linkage. The band-type brake can be configured to be normally applied (i.e., brake is on and flex arm is locked in position in vertical plane) and selectively released (i.e., released upon manual actuation), as described in further detail below.

The dental unit control head 152 can provide connections for one or more of liquid (water), compressed air, suction, electrical power, data, etc., various instruments and devices that use these connections, storage for the instruments and devices, and/or a display, among other components. The control head 152 can have a handle 155 for a user to grasp with his or her hand to facilitate moving the control head 152, which is frequently repositioned during treatment. The handle 155 can include an actuator, which may be mechanical, electrical, active, passive or combinations thereof. As described below for some implementations, the handle 155 has a passive actuator to operate the positive positioning device 144*a*, the positive positioning device 144*b* and/or the brake 145, as is described below in more detail.

Figure 2:
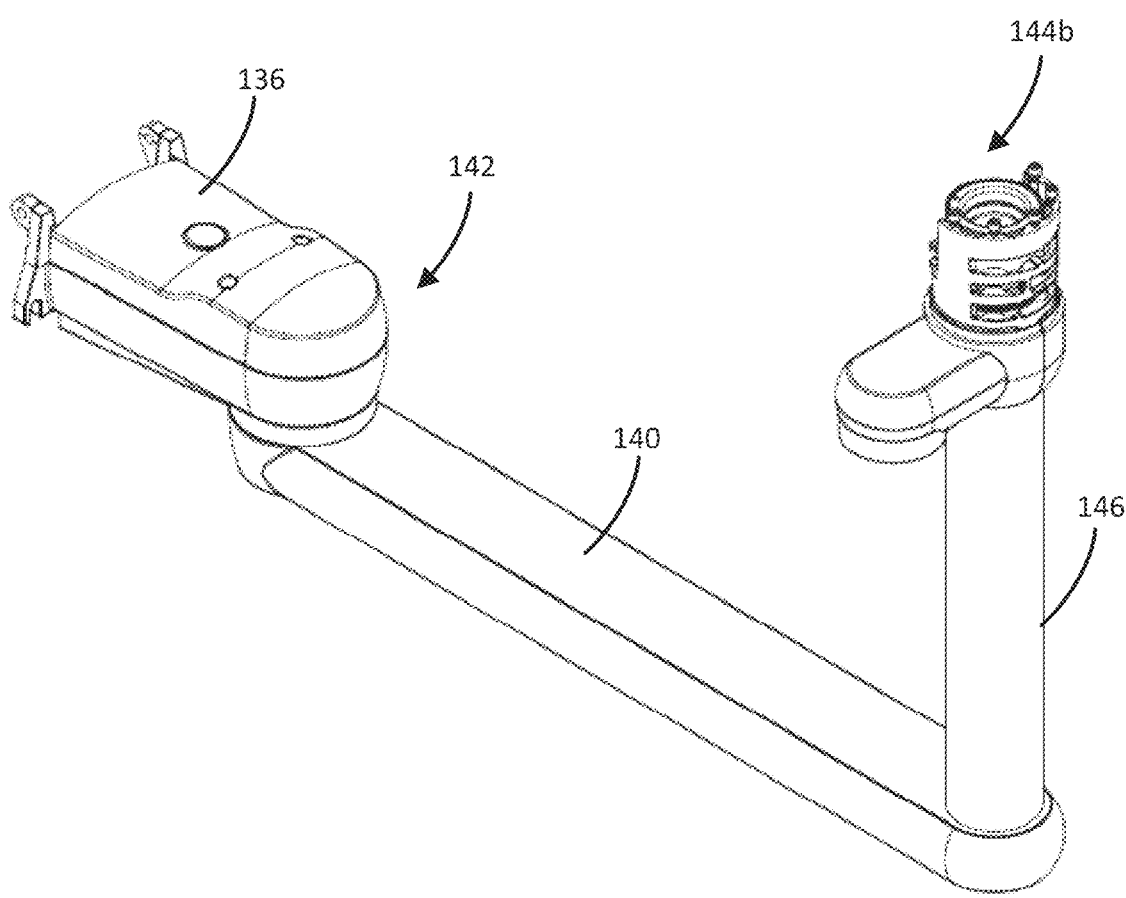
FIG. 2 is a perspective view of a representative unit arm of the dental chair assembly in which selected pivot connections have positive positioning devices.
Figure 3:
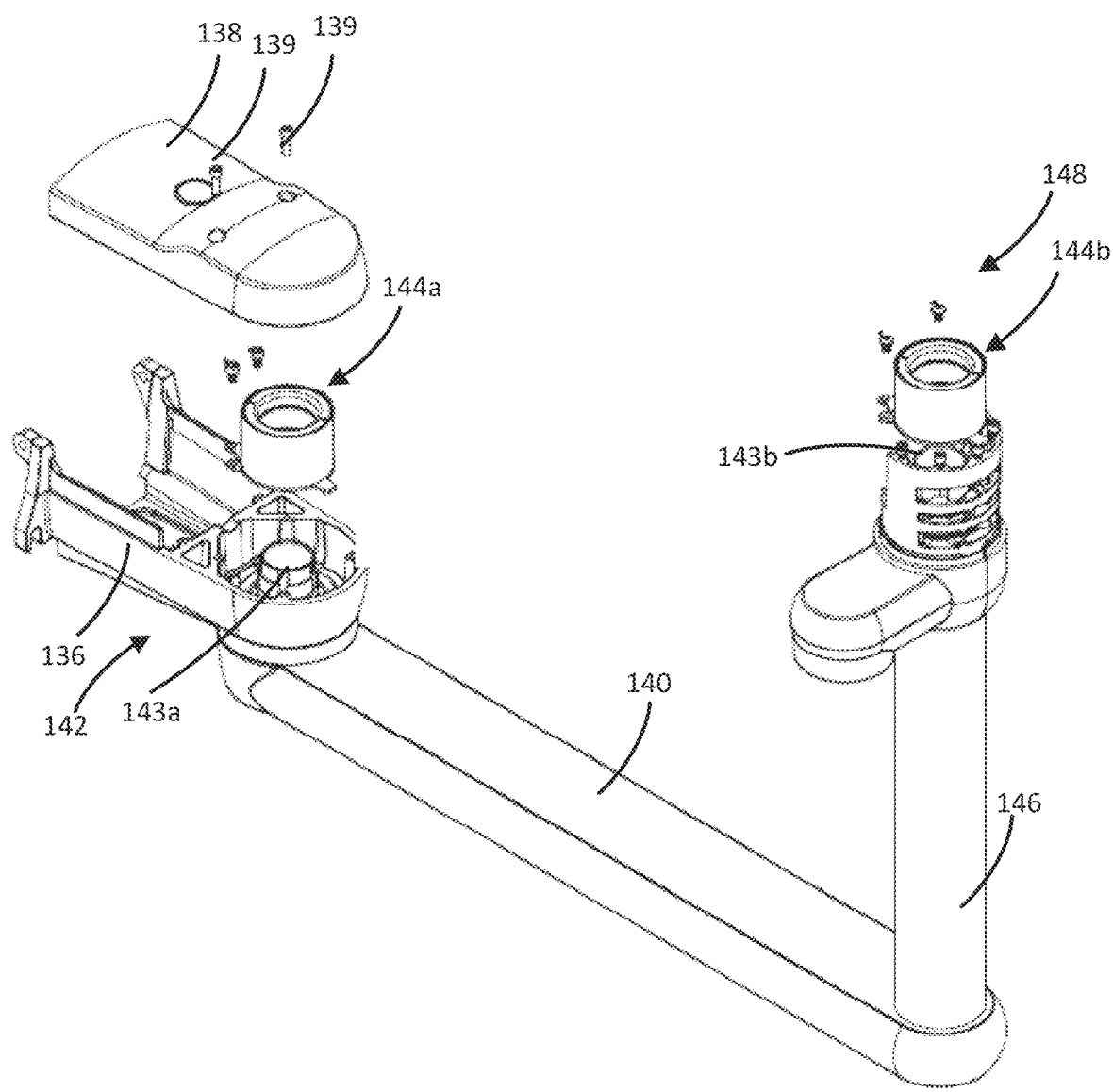
FIG. 3 is an exploded perspective view of a dental unit arm and the positive positioning devices of FIG. 2.

FIG. 2 is a perspective view of the dental unit arm mount 136, the dental unit arm 140 and the post 146, which are shown in isolation. FIG. 3 is a similar perspective view, except showing exploded depictions of the dental unit arm pivot 142 and the flex arm pivot 148. Specifically, the dental unit arm mount 136 has a cover 138 that is attached by fasteners 139. With the cover 138 removed, a pivot shaft 143*a* is visible. The pivot shaft 143*a* provides the pivot connection between the dental unit arm 140 and the dental unit arm mount 136. In the illustrated implementation, the pivot shaft 143*a* is hollow, which provides a space for routing conduits, cables, wires, etc. as shown. The positive positioning device 144*a* can be configured to fit around the pivot shaft 143*a* and within the surrounding space defined in the dental unit arm mount 136 and/or cover 138.

Similarly, the flex arm pivot 148 can have a hollow pivot shaft 143*b* providing the pivot connection between the post 146 and the flex arm 150 (FIG. 1), and the positive positioning device 144*b* can be configured to fit around the pivot shaft 143*b*.

Figure 4:
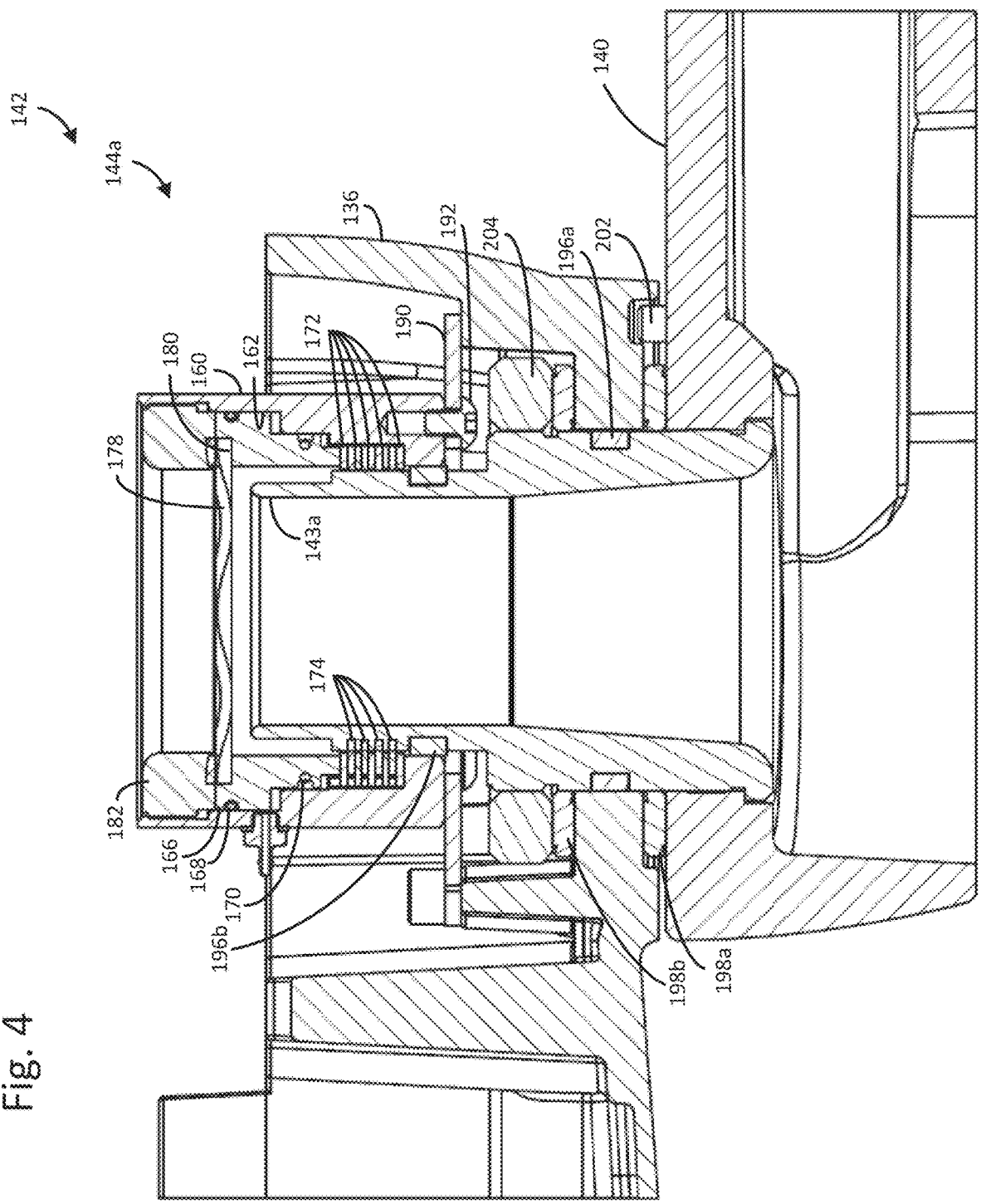
FIG. 4 is a sectioned elevation view of the positive positioning device as assembled in a representative pivot connection.
Figure 5:
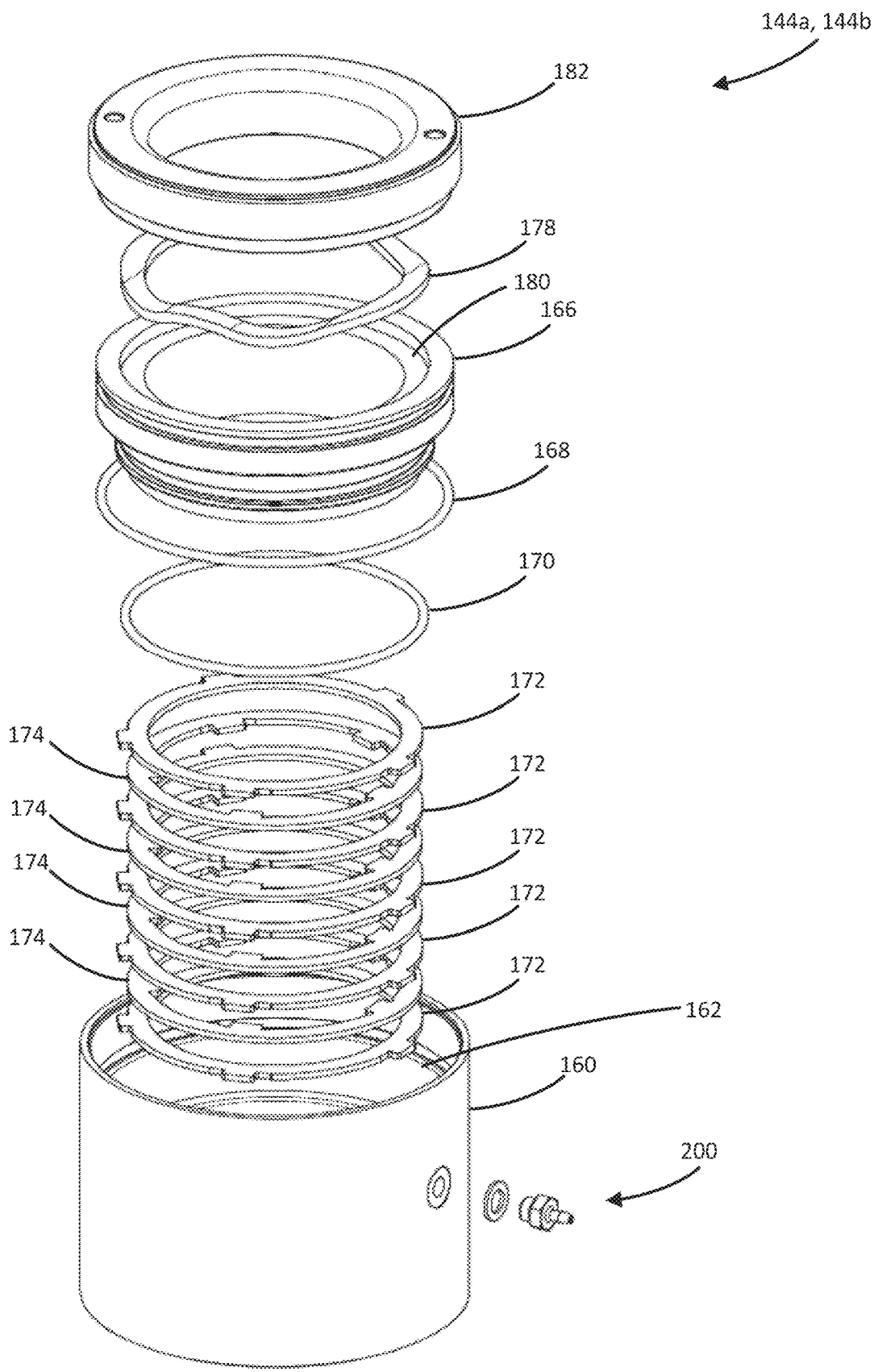
FIG. 5 is an exploded perspective view of the positive positioning device of FIG. 4.

Details of the positive positioning device 144*a*, 144*b* are described below in connection with FIGS. 4 and 5. FIG. 4 is a sectioned view in elevation of a representative pivot connection and its respective positive positioning device. Specifically, FIG. 4 shows the pivot connection 142 between the dental unit arm mount 136 and the dental unit arm 140, including portions of those members, and the positive positioning device 144*a*. FIG. 5 is an exploded perspective view of the positive positioning device 144*a*, 144*b*.

As shown in FIGS. 4 and 5, the positive positioning device 144*a*, 144*b* has a device body 160, which can have a generally cylindrical configuration as shown. The device body 160 has an inner wall defining a cylinder 162. A piston 166 is shaped to fit within the device body 160 and to slidingly engage the cylinder 162. The piston 166 can be provided with one or more seals, such as an O-ring 168 and an O-ring 170 as shown. The piston 166 can be configured to exert force in an axial direction, tending to secure the dental unit arm mount 136 and the dental unit arm 140 together and resist pivoting movement of the dental unit arm 140. For example, the piston 166 can be configured to exert force against multiple plates arranged in a clutch-like configuration. As shown in FIGS. 4 and 5, there is a first set of multiple clutch plates 172 and a second set of multiple friction plates 174 that are interleaved with the clutch plates 172. The clutch plates 172 and the friction plates 174 cooperate with each other to provide resistance to movement when compressed together, similar to a conventional clutch. Other resistance mechanisms could also be implemented to provide a suitable resistance.

The clutch plates 172 can be keyed to the device body 160, i.e., they can be rotationally fixed relative to the device body 160 by external tabs that fit within a groove formed in the body. Similarly, the friction plates 174 can be keyed to the pivot shaft, i.e., they can be rotationally fixed relative to the pivot shaft 143*a* by internal tabs that are received in a groove(s). In other implementations, the keying of the clutch plates 172 and the friction plates 174 is reversed.

In some implementations, the piston 166 is normally configured to apply force. In the illustrated implementation, a spring element 178 or other similar device bears against a contact surface 180 on the piston 166 to urge it against the stack of clutch plates 172 and friction plates 174. The spring element 178 and piston 166 are held in their respective positions by a retaining member, such as a spanner ring 182 that is threadedly received in an outer end of the device body 160. The dental unit arm mount 136 can have a mounting plate 190 to which the positive positioning device 144*a* is coupled, e.g., with fasteners 192. There can be a first wear ring 196*a* positioned around the pivot shaft 143*a* and in contact with the surrounding portion of the dental unit arm mount 136. Similarly, there can be a second wear ring 196*b* positioned around the pivot shaft 143*a* and in contact with the body 160. The wear rings 196*a*, 196*b* can be provided as shown to prevent metal-to-metal contact between moving parts. Bearings 198*a*, 198*b* are provided as shown to support the components of the pivot connection, including in rotation. A rotational stop mechanism 202 can be used to allow a range of permitted rotation to be selected.

A spanner locknut 204 can be provided, e.g., to assist with assembly. In some implementations, the pivot shaft 143*a* is press fit within the unit arm 140. When the unit arm 140 is positioned with the pivot shaft 143*a* projecting upward for assembly into the unit arm mount 136, the spanner locknut 204, which is internally threaded, can be threaded onto an externally threaded section of the pivot shaft 43*a* to hold the dental unit arm 140 in place while the positive positioning device 144*a* is being assembled and tightened.

As described, the positive positioning device 144*a*, 144*b* is normally engaged to exert a force to resist pivoting motion between the two elements connected by the respective pivot, such as the dental unit arm mount 136/dental unit arm 140 or the post 146/flex arm 150. The force applied to resist pivoting motion is configured to be selectively releasable to allow substantially free pivoting, i.e., pivoting without any applied resistance. For example, the positive positioning device 144*a*, 144*b* can be provided with a manual release, manual actuator or other type of release device to release the applied force. In some implementations, a pneumatic or other type of force is applied to counteract the piston force. In some implementations, "manual" release or "manually" actuated means that the user's hand is present or active in actuating a device.

Referring to FIG. 5, in the case of a piston applied force, the device body 160 can be fitted with a pneumatic connection 200 through which air can be supplied to exert a pneumatic force against the piston 166 and spring 178, thereby releasing the force to resist pivoting motion normally applied by the piston 166/spring 178. These implementations are sometimes referred to as having "spring applied/air released" control. In other implementations, a magnetic, electrical or manually applied force could be used to release the force applied by the piston.

One advantage of having the default or normal mode of the positive positioning devices and brake configured to be the force applied mode, i.e., to resist movement, is that the various components will tend to remain in their positions as set in the event that power to the assembly is turned off or fails. In this way, undesired movement of the arm and equipment can be avoided.

In some implementations, a pneumatic release force is generated with an available source of pressurized air. In some applications, the pressurized air may be at 80-120 psi, so the release force is determined based on the minimum available pressure, i.e., 80 psi in this case.

Figure 6:
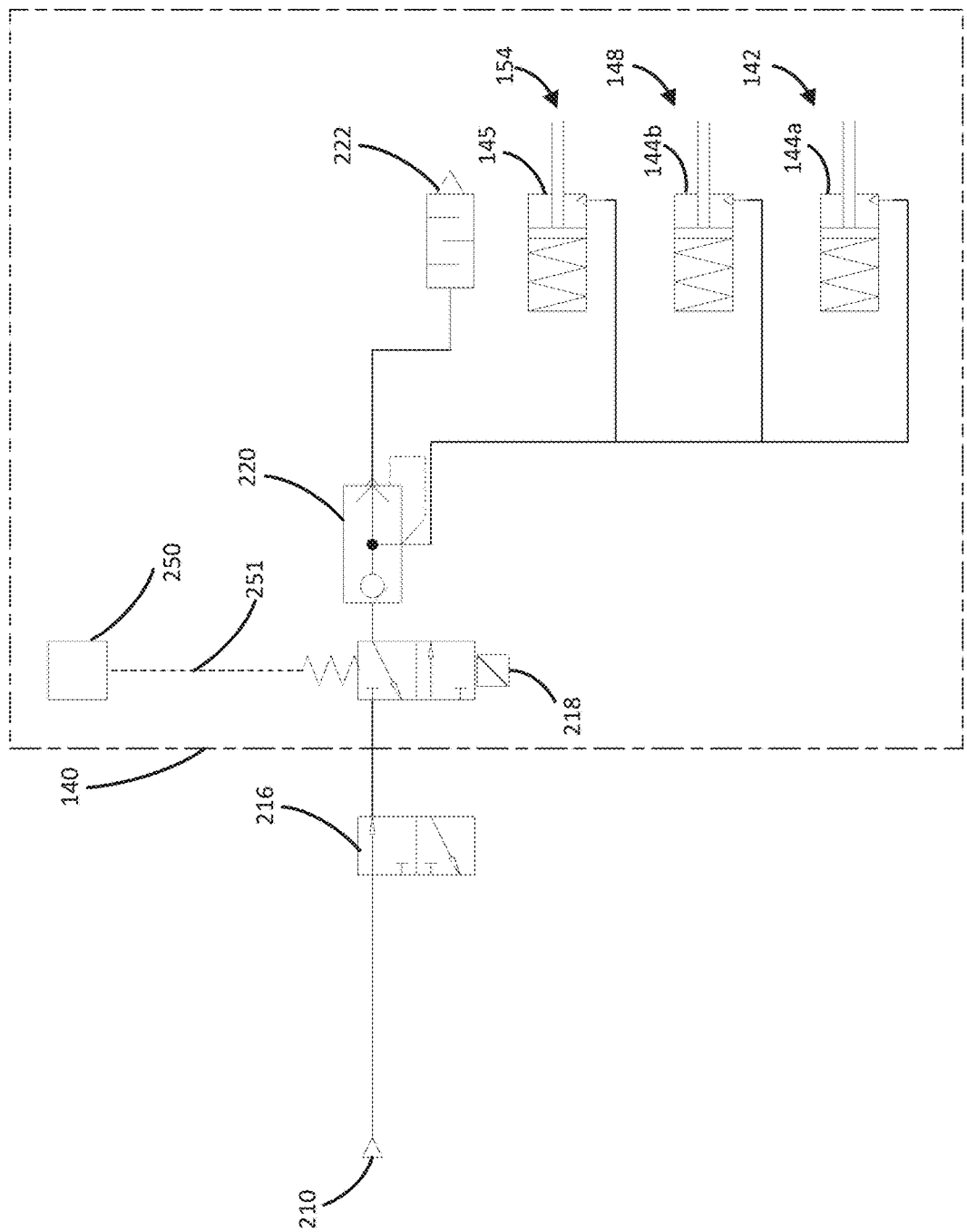
FIG. 6 is a schematic control diagram for the spring-applied/pneumatically released positive positioning system that includes the positive positioning devices of FIG. 5.

FIG. 6 is a schematic structure and control diagram for a pneumatic circuit that includes the positive positioning devices 144*a* and 144*b*. In the example configuration of FIG. 6, the positive positioning devices 144*a* and 144*b* are arranged in parallel with each other, and also in parallel with the brake 145 for the flex arm 150.

As illustrated, there is a supply 210 of pressurized air, such as at 80-125 psi. In some implementations, the supply 210 of pressurized air is a compressed air supply for the building in which a dental operatory is located.

The pressurized air is fed along a line, through an optional master on/off toggle valve 216 and to a brake control solenoid valve 218. Although not shown, the line from the supply 210 may include any number of conventional devices, such as a gate valve, a filter and/or one or more other valves. The brake control solenoid valve 218, when actuated, causes the positive positioning device 144*a* in the dental unit arm pivot 142, the positive positioning device 144*b* be in the flex arm pivot 148 and the flex arm brake 145 in the flex arm knuckle 154 to be released. A quick exhaust valve 220 allows air pressure in the circuit to be released relatively quickly, which tends to reduce any drift that may occur before the positive positioning devices and brake are applied. An optional muffler 222 helps to reduce noise from air pressure being released.

As described, the brake control solenoid valve 218 is selectively actuated to initiate release of one or more of the positive positioning devices 144*a*, 144*b*, and the flex arm brake 145. In the illustrated implementation of FIG. 6, these three devices are released concurrently with each other. Other approaches are also possible, such as releasing the positive positioning devices 144*a*, 144*b*, concurrent with each other, while using a different approach for the flex arm brake 145. In still other implementations, it would be beneficial to have each of the positive positioning devices 144*a*, 144*b* and the flex arm brake 145 configured to be separately controllable.

The brake control solenoid valve 218 is preferably configured for passive manual activation. In some implementations, an actuator 250 is actuated or activated, such as by a user's hand or manually, which causes a control signal to be transmitted to the brake control solenoid valve 218 to actuate the valve. The control signal can be transmitted by a control line, such as the line 251, or wirelessly. The actuator 250 can be located remotely or locally. In some implementations, the actuator 250 is configured as a capacitive sensor handle that senses when an operator grasps the handle (or other structure) according to predetermined parameters (e.g., area of handle, duration, etc.) and then triggers the control signal to be sent. For example, the handle 155 of FIG. 1 could be configured as a capacitive touch sensor or switch.

As indicated, the components 218, 220, 222 and 150 are shown as being generally part of the dental unit arm, but it would be possible to configure the pneumatic and control circuits in other ways.

Figure 7:
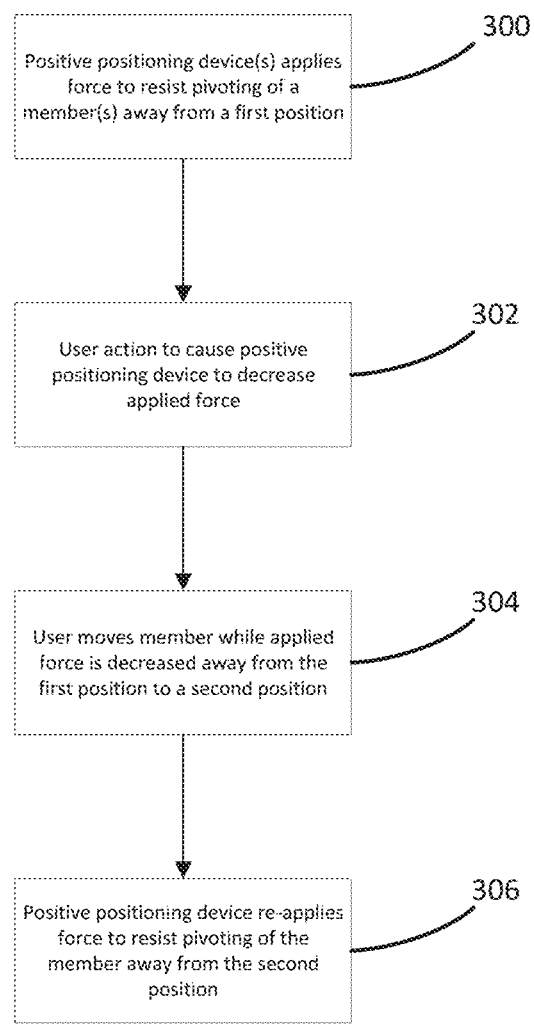
FIG. 7 is a flow chart of a method implementation of using the positive positioning device.

A method implementation of using positive positioning is shown generally in connection with the flow chart of FIG. 7. In step 300, a positive positioning device (or multiple devices) applies force to resist pivoting of a member away from a first position. In step 302, a user takes an action to cause the positive positioning device to decrease the applied force. In step 304, while the applied force is decreased, the user moves the member away from the first position and to a second position. In step 306, the positive positioning device re-applies force to resist pivoting of the member away from the second position.

In addition to the spring applied/air released piston described above, the positive positioning device can be implemented using a double acting air piston 450, a band-type brake 452, a collet 454, a disc brake 456, a hydraulic bladder 458 and/or a pawl lock 460, among other similar approaches, which are described below.

Referring to step 302, the user action taken to cause the positive positioning device to decrease the applied force, also sometimes referred to herein as activation or actuation, can be contact with (or presence near) a switch as described above, such as involving a user's hand, or similarly, actuation of a foot control by contact or presence. In addition, the user action could be implemented by having the user touch a touch screen, or to touch or grasp another part of the nearby structure. In other implementations, the positive positioning device could be caused to decrease the applied force in coordination with a specified action such as, e.g., moving the chair from a treatment position to an ingress/ egress position.

Referring to step 304, the user moves the member (such as an arm or other member) while the applied force is decreased. In the implementation described above, the user can use the handle 155 to move the control head 152. In other examples, the handle may be integrated or not present, in which case the user may grasp the control head, the post or other movable portion to move the member or equipment.

Referring to step 306, once the member is positioned as desired in a second position, the positive positioning device is controlled to re-apply force to resist pivoting of the member away from the second position. The positive positioning device can be controlled to reapply the force when the handle or other control is released or deactivated, or when the user actuates another control (e.g., a touch on a touch screen, a button, etc.). The positive positioning device could also be controlled to reapply the force after an elapsed time interval.

In addition to implementations in which activation or actuation includes a user touching a handle or otherwise activating a capacitive touch sensor in a handle or handle area, other implementations are envisioned. For example, the user can initiate operation by using his or her foot on or in the area of a foot control, touching a touch screen, or actuating another type of control. The control or controls may be located near and/or remote from the member.

Control signals may be digital signals, analog signals, low voltage signals, and/or mechanical signals. Instead of a control signal, a control linkage could also be implemented.

Figure 8A:
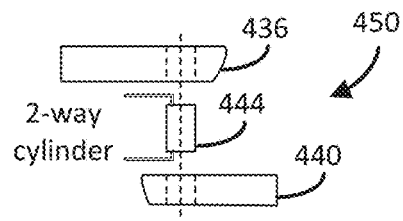
FIGS. 8A-8E are schematic exploded side views of an arm, arm mount and pivot connection showing various alternative implementations of the positive positioning device.
Figure 8D:
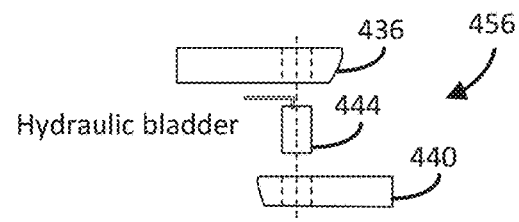
Figure 8B:
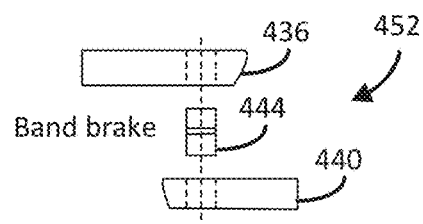
Figure 8E:
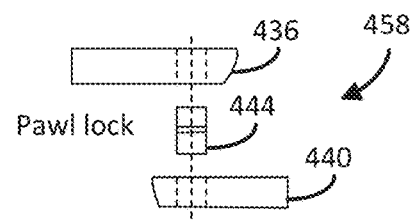
Figure 8C:
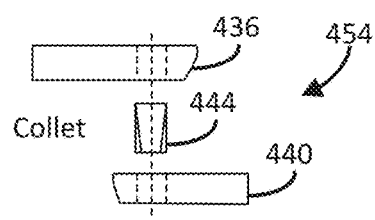

FIGS. 8A-8E are schematic exploded side view drawings of various alternative implementations showing an arm mount 436, a pivoting member or arm 440 and a positive positioning device 444 positioned at a pivot connection between the arm 440 and the arm mount 436. In FIG. 8A, the positive positioning device 444 is implemented as the two-way air cylinder 450 so that pressurized air is used to apply and release the piston. In FIG. 8B, the positive positioning device 444 is implemented as the band brake 452. In FIG. 8C, the positive positioning device 444 is implemented as the collet 454, similar to the connection arrangement used for some machine tool spindles. In FIG. 8D, the positive positioning device 444 is implemented as the hydraulic bladder 456 that is pressurized to apply the force and depressurized to decrease the force. In FIG. 8E, the positive positioning device 444 is implemented as a pawl lock 458 that allows the member to be pivoted between predefined positions.

In some implementations, positive positioning is accomplished with pressurized air supplied at 80-125 psi and can provide a moment of 145 lb-in resistance to movement about a pivot axis. In some implementations, activating the release device to provide a counteracting force, such as with pressurized air, reduces the resistance to movement about the pivot axis to a maximum of 45 lb-in. In some implementations, positive positioning is achievable with components that are out of level by up to 3 degrees.

In some implementations, the resistance to movement about the pivot axis is set to a very high level, such that associated positive positioning device is set operate similar to a brake and not intended to move unless released.

The clutch plates 172 and friction plates 174 are preferably made of a low carbon steel in a stamping process to allow for achieving the proper geometry and sufficient surface friction. The body 160 is preferably formed of a sintered steel, and can be formed with an internal step to cooperate with the piston 166, clutch plates 172 and friction plates 174. The piston 166 is preferably made of aluminum for creep and corrosion resistance and ease of machining. The spring 178 may be a wave spring, which has a sufficiently high spring rate and is sufficiently durable to ensure a long useful life. Other types of springs, as well as other types of devices sufficient to bias the piston 166 into a normally applied position, could also be used. The spanner ring 182 can be made of plated steel for corrosion resistance.

In addition to the equipment and instrumentation shown for the dental treatment assembly 100, there could of course be other optional equipment and instrumentation, such a cuspidor, dental light(s), assistant instrumentation, holders, monitor(s), etc. that has been omitted for clarity in the illustrated implementation. Such equipment and instrumentation would typically be supported independent of the dental unit arm as described, but in some cases, the dental unit arm could support other equipment and/or instrumentation in addition to the control head. In addition, arms other than the dental unit arm could be fitted with the positive positioning device.

Although the illustrated implementations shows the dental unit arm and dental unit that are connected to the dental treatment assembly 100, the positive positioning device can also be implemented to control pivoting of arms that are mounted in different ways, such as to a wall, floor, ceiling or freestanding support.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A positive positioning device, comprising:
   a dental unit arm having a dental unit arm pivot shaft to pivotably couple the dental unit arm to a dental chair assembly;
   a body within having an internal bore within which a cylinder is defined;
   multiple stacked plates housed within the body, the multiple stacked plates having a central opening defined therein and in which the dental unit arm pivot shaft is received, the multiple stacked plates comprising keyed clutch plates and keyed friction plates, wherein the keyed clutch plates and the keyed friction plates are interleaved with each other, and wherein the keyed clutch plates are keyed with one of the body or the dental unit arm pivot shaft and the keyed friction plates are keyed with the other of the body or the dental unit arm pivot shaft;
   a spring-biased piston shaped to slide within the internal bore to apply a force to the multiple stacked plates to resist rotation of the dental unit arm pivot shaft relative to the multiple stacked plates; and
   a piston release device actuatable by a user to release the spring-biased piston to decrease force applied to the multiple stacked plates and allow free rotation of the dental unit arm pivot shaft.

2. The positive positioning device of claim 1, wherein the piston release device comprises a connection to a pneumatic circuit configured to apply pneumatic pressure to counteract the spring-biased piston.

3. The positive positioning device of claim 1, wherein the piston release device comprises a capacitive touch handle configured to actuate the piston release device upon a predetermined touch by the user.

4. The positive positioning device of claim 1, wherein the piston release device is manually actuatable by the user.

5. The positive positioning device of claim 1, wherein the piston release device is remotely positioned relative to the spring-biased piston.

6. The positive positioning device of claim 1, wherein the keyed friction plates are internally keyed to engage the dental unit arm pivot shaft and the keyed clutch plates are externally keyed to engage the body.

7. The positive positioning device of claim 1, further comprising a retaining member engageable with an end of the body to retain the spring-biased piston in position.

8. The positive positioning device of claim 1, wherein the spring-biased piston comprises a piston, at least one peripheral seal on the piston and a wave washer shaped to fit between the piston and a stationary surface.

9. The positive positioning device of claim 1, wherein the spring-biased piston is a first spring-biased piston, and wherein the piston release device is configured to release a second spring-biased piston concurrent with releasing the first spring-biased piston.

10. The positive positioning device of claim 1, wherein the central opening in the multiple stacked plates is positioned to extend vertically such that the dental unit arm pivot shaft received in the central opening pivots in a horizontal plane.

11. The positive positioning device of claim 1, wherein the force applied to the multiple stacked plates by the spring-biased piston is a positive positioning force, wherein the positive positioning force is sufficiently high to prevent drift of the dental unit arm.

12. The positive positioning device of claim 1, wherein the body that houses the multiple stacked plates and the spring-biased piston is part of a dental unit arm mount coupleable to the dental chair assembly.

13. A positive positioning system, comprising:
- at least a first arm segment pivotably connected at a proximal end to a first pivot;
- at least a second arm segment coupled directly or indirectly to the first arm segment at a second pivot;
- a first positive positioning device located at the first pivot, and a second positive positioning device located at the second pivot, wherein the first and second positive positioning devices are set to normally resist rotation of the first and second pivots, respectively;
- at least one vertical plane pivot located distally of at least one of the first and the second pivot, wherein the vertical plane pivot is configured to allow rotation in a vertical plane and comprises a brake; and
- a user handle positioned distally of the second pivot, the user handle being configured to trigger release of the first and second positive positioning devices and the brake upon detecting contact between a user's hand on the user handle via capacitive sensing for a pre-determined time period to allow the user to reposition at least one of the first and second arm segments.

14. The positive positioning system of claim 13, wherein the first and second positive positioning devices are normally spring-biased to apply force to the respective first and second pivots to resist pivoting movement thereof.

15. The positive positioning system of claim 13, wherein the user handle is connected by a control line to the first positive positioning device, the second positive positioning device, and the brake.

16. The positive positioning system of claim 13, wherein the first positive positioning device, the second positive positioning device, the brake and the user handle are configured for interconnection in a pneumatic circuit.

17. The positive positioning system of claim 16, wherein the pneumatic circuit comprises a brake control solenoid valve controlled by the user handle and a quick exhaust with connections to the first positive positioning device, the second positive positioning device and the brake.

18. The positive positioning system of claim 13, wherein the first arm segment comprises a vertical post portion, further comprising a knuckle with the vertical plane pivot coupled directly or indirectly to the vertical post portion.

19. The positive positioning device of claim 18, wherein the knuckle is a first knuckle and the vertical plane pivot is a first vertical plane pivot, further comprising a second knuckle with a second vertical plane pivot positioned at a distal end of the second arm segment and a support arm segment extending from the second knuckle and configured to support a control head.

20. The positive positioning system of claim 13, further comprising a dental unit control head positioned distally of the second arm segment, and wherein the positive positioning system is configured to support and maintain a desired position of the dental unit control head.

21. The positive positioning system of claim 13, wherein the first arm segment comprises a vertically-extending post portion defining a distal end of the first arm segment and the second pivot is positioned at the distal end of the first arm segment.

22. The positive positioning system of claim 13, wherein the brake is a band brake.

23. A positive positioning system, comprising:
- at least a first arm segment pivotally connected at a proximal end to a first pivot;
- at least a second arm segment coupled directly or indirectly to the first arm segment at a second pivot;
- a first positive positioning device located at the first pivot, and a second positive positioning device located at the second pivot, wherein the first and second positive positioning devices are set to normally resist rotation of the first and second pivots, respectively; and
- a vertical plane pivot configured to allow rotation in a vertical plane, the vertical plane pivot comprising a brake;
- a user-actuated control device interconnected with the first and second positive positioning devices and the brake in a control circuit, wherein the user-actuated control device is actuatable to release the first and second positive positioning devices and the brake concurrently to allow a user to reposition at least one of the first and second arm segments.

24. The positive positioning system of claim 23, wherein the first and second positive positioning devices are normally spring-biased to apply force to the respective first and second pivots to resist pivoting movement thereof.

25. The positive positioning system of claim 23, wherein the user-actuated control device comprises a capacitively-activated control.

26. The positive positioning system of claim 23, wherein the user-actuated control device causes the first and second positive positioning to re-apply force after actuation is discontinued.

27. The positive positioning system of claim 23, wherein the first arm segment comprises a vertical post portion and the second pivot is located at a distal end of the vertical post portion, further comprising a knuckle with the vertical plane pivot connection positioned distally of the second pivot connection.

28. The positive positioning device of claim 27, wherein the knuckle is a first knuckle and the vertical plane pivot is a first vertical plane pivot, further comprising a second knuckle with a second vertical plane pivot positioned at a distal end of the second arm segment and a support arm segment extending from the second knuckle and configured to support a dental unit control head.

29. The positive positioning system of claim 23, wherein the control circuit comprises a pneumatic brake control solenoid valve controlled by the user-actuated control device and a quick exhaust with connections to the first positive positioning device, the second positive positioning device and the brake.

30. The positive positioning system of claim 23, further comprising a dental unit control head positioned distally of the second arm segment; and wherein the positive positioning system is configured to support and maintain a desired position of the dental unit control head.

31. The positive positioning system of claim 23, wherein the brake is a band brake.

* * * * *

UNITED STATES PATENT AND TRADEMARK OFFICE
CERTIFICATE OF CORRECTION

PATENT NO. : 11,027,438 B2
APPLICATION NO. : 16/035168
DATED : June 8, 2021
INVENTOR(S) : Keen et al.

Page 1 of 1

It is certified that error appears in the above-identified patent and that said Letters Patent is hereby corrected as shown below:

In the Claims

Column 10, Line 47, "a body within having" should read -- a body having --.

Signed and Sealed this
Fourth Day of February, 2025

Coke Morgan Stewart
*Acting Director of the United States Patent and Trademark Office*